United States Patent [19]

Noe

[11] Patent Number: 5,527,378
[45] Date of Patent: Jun. 18, 1996

[54] SINTERING URANIUM PURIFICATION PROCESS

[75] Inventor: Ronald O. Noe, Hopkins, S.C.

[73] Assignee: Westinghouse Electric Corporation, Pittsburgh, Pa.

[21] Appl. No.: 356,752

[22] Filed: Dec. 15, 1994

[51] Int. Cl.$^6$ ................................................. C22B 60/00
[52] U.S. Cl. ............................. 75/398; 423/260; 423/261
[58] Field of Search .................................... 423/260, 261; 252/636; 73/398

[56] References Cited

U.S. PATENT DOCUMENTS

| | | | |
|---|---|---|---|
| 2,768,873 | 10/1956 | Beese | 423/19 |
| 2,850,379 | 9/1958 | Hawkes . | |
| 3,087,781 | 4/1963 | Levey et al. . | |
| 3,140,151 | 7/1964 | Foltz et al. | 423/3 |
| 3,714,061 | 1/1973 | Triggiani et al. | 252/636 |
| 3,806,565 | 4/1974 | Langrod | 264/0.5 |
| 3,930,787 | 1/1976 | DeHollander et al. | 423/198 |
| 4,122,095 | 10/1978 | Watt et al. | 266/346.11 |

*Primary Examiner*—Ngoclan Mai

[57] ABSTRACT

Finely powdered urania scrap materials are subjected to sintering conditions (greater than 1600° C.) in a hydrogen atmosphere for about 4 to 8 hours in order to remove impurities (such as Si, Fe, Ni, Sn, Cu, Na and Pb). The process upgrades the quality of the urania powder to where it can be used directly as clean scrap makeup, thereby avoiding expensive decontamination and recovery steps like solvent extraction. The novelty of the process is in the use of sintering conditions (greater than 1600° C.) in a hydrogen atmosphere on finely divided powder to decontaminate urania materials.

5 Claims, No Drawings

SINTERING URANIUM PURIFICATION PROCESS

BACKGROUND OF THE INVENTION

1. Field of the Invention

This invention is directed to purification of urania materials. Finely divided urania scrap materials are subjected to sintering conditions at high temperatures of greater than 1600° C. in a freely flowing hydrogen atmosphere to remove impurities such as Si, Fe, Ni, Sn, Cu, Na and Pb.

2. Background Information

Poor uranyl nitrate filtration during dissolution of certain blends of urania powder for clean scrap is an ongoing problem. Expensive decontamination and recovery steps like solvent extraction have plagued the industry for years. Attempts to solve the problems via re-oxidation and extra calciner treatment have met with only limited success.

Beese, U.S. Pat. No. 2,768,873, discloses a method of purifying uranium wherein uranium oxide is ground, placed in a crucible and introduced into a furnace at 1200° C. in an air atmosphere in order to volatize boron impurities. The Beese patent addresses the removal of only one element, boron, and that process is done in an oxidizing atmosphere only.

Foltz, U.S. Pat. No. 3,140,151, discloses a method of reprocessing sintered irradiated $UO_2$ by subjecting it to a number of oxidizing and reducing cycles. The Foltz patent addresses processing only irradiated urania materials with substantially lower temperatures and alludes to removal of only the more volatile elements/radionucleides. It also makes substantial use of intermediate oxidizing conditions.

SUMMARY OF THE INVENTION

A novel and improved sintering uranium purification process comprises removing metallic impurities (such as Si, Fe, Ni, Sn, Cu, Na and Pb) from finely divided powdered urania ($UO_2$ and $U_3O_8$) materials, for instance at least about 40 mesh down to 400 mesh.

The process comprises purifying finely divided urania materials to remove impurities by sintering the urania materials at a temperature of greater than 1600° C. in a hydrogen atmosphere for about 4 to 8 hours. The process is preferably carried out at about 1700° C. to 1800° C. and most preferably at about 1725°–1775° C. The sintering preferably takes place for about 4 to 8 hours with continuously flowing fresh hydrogen moving through the sintering tunnel.

The advantages of the sintering uranium purification of the present invention include:

1. the use of substantially higher operating temperatures which increases the volatility of a number of normally refractory elements such as Fe, Ni, Si and facilitates their removal;
2. the use of hydrogen gas as a chemical agent for gettering the impurities;
3. the use of the above process to remove a multiplicity of impurities;
4. decontamination of the powdered uranium material to a point where it becomes processable without further decontamination steps such as solvent extraction; and
5. a dramatic improvement in the products dissolution.

DESCRIPTION OF THE PREFERRED EMBODIMENT

The sintering purification process for uranium dioxide ($UO_2$) consists of passing the $UO_2$, in finely divided powdered form of at least about 40 mesh down to 400 mesh through an electrically heated high temperature furnace. The temperature is greater than 1600° C., preferably 1700° to 1800° C. and most preferably 1725° to 1775° C., blanketed with continuously flowing fresh hydrogen gas. The furnace is constructed of refractory brick and metal configured to form a long rectangular cross-section tunnel through which box-shaped molybdenum containers called "boats" containing the $UO_2$ are mechanically pushed. The boats are set in contact with each other forming a "train" of about 50 boats to proceed through the tunnel. About every 15–30 minutes, preferably 20 minutes, a fresh boat is placed at the beginning of the train at the entrance end of the tunnel and the entire train of boats is pushed one boat-length. A finished boat is moved into position to exit the tunnel as a result of the push. Portions of finely divided $UO_2$ powder are placed in a train of the boats described above and pushed through the furnace. The entire pushing operation is called a "push cycle". Analysis of the powder impurities content was made before the purification sintering step, and a second analysis was done on the same powder after the purification. The results are shown in Table I hereinbelow.

The hydrogen blanket in the furnace is kept in place by supplying continuously flowing fresh hydrogen to one end of the furnace tunnel and exhausting it through a flare at the other end. The hydrogen functions to protect the $UO_2$ from oxidation at the temperature employed (greater than 1600° C., preferably 1700° to 1800° C. and most preferably 1725° to 1775° C.) and as a carrier gas to remove volatile constituents from the furnace as they are evolved. Hydrogen at above 1600° C. also functions as a chemical agent for gettering impurities that react with it to form volatile compounds. Temperatures along the tunnel form a hump-shaped profile with room temperature at the entrance and exit points, a ramp-up zone just inside the entrance gate, a hot zone at the center 80 to 100 inches of the furnace, and a cool-down zone just ahead of the exit gate. The urania material remains in the hot zone for about 4 to 8 hours.

It appears that finely divided powdered $UO_2$ presents a very large surface area to the high-temperature (greater than 1600° C.) hydrogen atmosphere so that impurities that are at or near their boiling point and impurities that will react with hydrogen at the elevated temperatures and form volatile compounds have an unimpeded path to detach from the $UO_2$ matrix and be swept away with the hydrogen flow.

It is very important to have:

1. a very high temperature of greater than 1600° C., preferably 1700° to 1800° C. and most preferably 1725° to 1775° C.;
2. $UO_2$ in the form of finely divided powder of at least about 40 mesh or less than 400 mesh; and
3. the presence of continuously flowing hydrogen gas used for decontamination.

Below is a summary Table I of results on the scrap powder sintering work. The table shows the "before sintering" analytical data for the powder lots listed with a "B" suffix, and the "after sintering" analytical data for the same lots identified by an "A" suffix under the respective lot numbers. The data represents a "snapshot" of the results available to date.

TABLE I

ANALYTICAL RESULTS OF POWDER SINTERING PROCESS
(Element Analyses in Parts Per Million (ppm))

| Lot No. | B | Cd | Co | Cu | F | Fe | Na | Ni | Pb | Sn | Si | Zn |
|---|---|---|---|---|---|---|---|---|---|---|---|---|
| 1B | 2.1 | 0.5 | 6.8 | 16 | 37 | 1239 | 55 | 188 | 7 | 14 | 2723 | 111 |
| 1A | 0.3 | 0.3 | 0.5 | 1 | na | 101 | 4 | 27 | 0.5 | 0.5 | 572 | 5 |
| 2B | 0.6 | 0.5 | 10 | 7 | 908 | 2543 | 326 | 394 | 0.5 | 6 | 1305 | 57 |
| 2A | 0.6 | 0.4 | 2 | 1 | 12 | 1896 | 4 | 354 | 0.5 | 2 | 1512 | 3 |
| 3B | 10 | 4.3 | 2.2 | 15 | 123 | 1686 | 479 | 219 | 23 | 13 | 3315 | 644 |
| 3A | 0.3 | 0.4 | 1.0 | 1 | 17 | 615 | 44 | 114 | 0.5 | 2 | 2146 | 1 |
| 4B | 2.5 | 0.5 | 1.3 | 4 | 88 | 1853 | 16 | 181 | 0.5 | 3 | 5158 | 51 |
| 4A | 0.4 | .03 | 0.9 | 1 | 30 | 1014 | 6 | 189 | 0.5 | 2 | 3450 | 1 |
| 5B | 176 | 35 | 43 | 813 | 12045 | 9999 | 4338 | 2288 | 693 | 230 | 9999 | 1677 |
| 5A | 108 | 0.6 | 30 | 478 | 14 | 2500 | 1441 | 1722 | 0.5 | 27 | 2500 | 5 |
| 6B | 0.3 | 0.5 | 1.4 | 3 | 188 | 1048 | 44 | 182 | 0.5 | 2 | 1702 | 94 |
| 6A | 0.3 | 0.3 | 7.4 | 1 | 23 | 317 | 4 | 56 | 0.5 | 1 | 1323 | 3 |
| 7B | 15 | 1.8 | 2.0 | 30 | 457 | 2140 | 147 | 90 | 8 | 1635 | 2570 | 469 |
| 7A | 0.5 | 0.4 | 0.8 | 1 | 47 | 1281 | 84 | 300 | 0.5 | 18 | 3271 | 11 |
| 8B | 12 | 6.4 | 8.7 | 67 | 1692 | 4244 | 119 | 311 | 17 | 28 | 2732 | 771 |
| 8A | 0.3 | 0.4 | 2.5 | 1 | na | 2263 | 26 | 172 | 0.5 | 7 | 4133 | 43 |
| 9B | 2.4 | 2.1 | 2.3 | 10 | 65 | 2182 | 7 | 365 | 0.6 | 21 | 6271 | 319 |
| 9A | 0.4 | 3.1 | 2.2 | 1 | na | 1698 | 5 | 186 | 0.5 | 8 | 6941 | 220 |
| 10B | 0.6 | 0.6 | 4.6 | 8 | 110 | 1887 | 19 | 224 | 1.5 | 3 | 3109 | 71 |
| 10A | 0.5 | 0.4 | 0.5 | 1 | 20 | 429 | 4 | 87 | 0.5 | 1 | 2000 | 2 |
| 11B | 16 | 1.2 | 4.9 | 85 | 888 | 5130 | 107 | 530 | 40 | 30 | 6360 | 480 |
| 11A | 0.7 | 0.5 | 4.9 | 2 | 20 | 3482 | 67 | 453 | 8 | 11 | 6252 | 1 |
| 12B | 0.6 | 0.4 | 8.3 | 2 | 224 | 1420 | 4 | 171 | 0.5 | 4 | 1909 | 32 |
| 12A | 0.3 | 1.7 | 6.1 | 2 | na | 359 | 4 | 20 | 0.5 | 1 | 657 | 37 |
| 13B | 68 | 6.6 | 11 | 70 | 13292 | 2618 | 1035 | 211 | 24 | 14 | 4345 | 644 |
| 13A | 0.3 | 0.4 | 2 | 1 | na | 1428 | 100 | 177 | 0.5 | 2 | 6500 | 4 |

The benefits of the present invention are as follows:

1. The decrease in impurity levels has been realized in most of the data. The sintering conditions of the present invention are particularly effective in removing copper, iron, fluoride, sodium and boron. Silica removal occurs to some degree on most batches. This may be the result of sampling variances or a boil-off-recondensing phenomenon or in the sintering furnace itself. Operating technique changes were adopted to remove material from the hot zone of the furnace during prolonged shutdowns in an effort to minimize the recondensing of impurities on powder in cooler regions of the furnace.

2. Two lots (10 and 4) are confirmed upgraded from solvent extraction grade to clean scrap with the impurities reduced below 5000 ppm respectively which converts to a direct cost savings in solvent extraction costs.

3. All treated material is markedly easier to dissolve, approaching the ease of dissolution found with pure urania. This is a major improvement over past operating experience in which filtration of the dissolved lots of impure powder was very slow and difficult.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting to the scope of the invention, which is to be given the full breadth of the appended claims.

I claim:

1. A process for purifying urania materials to remove impurities, the process comprising sintering the finely divided powdered urania materials at a temperature greater than 1600° C. in a hydrogen atmosphere for about 4 to 8 hours.

2. The process of claim 1, wherein the sintering temperature is about 1700° to 1800° C.

3. The process of claim 2, wherein the sintering temperature is about 1725° to 1775° C.

4. The process of claim 1, wherein a continuous flow of fresh hydrogen carries away impurities.

5. The process of claim 1, wherein the sintering temperature is about 1725° to 1775° C. for about 4 to 8 hours and a continuous flow of fresh hydrogen carries away impurities.

* * * * *